United States Patent [19]
Kitai

[11] 3,741,087
[45] June 26, 1973

[54] ELECTRIC SHUTTER EXPOSURE-TIME CONTROL CIRCUIT HAVING COUNTER LIGHT COMPENSATION

[75] Inventor: Kiyoshi Kitai, Tokyo, Japan

[73] Assignee: Kabushiki Kaisha Hattori Tokeiten, Tokyo, Japan

[22] Filed: Feb. 9, 1971

[21] Appl. No.: 113,840

[30] Foreign Application Priority Data
Feb. 12, 1970 Japan.................................. 45/11470

[52] U.S. Cl. .............. 95/10 CT, 95/53 EB, 356/222
[51] Int. Cl. .............................................. G03b 7/08
[58] Field of Search .......... 95/10 C, 10 CE, 10 CT, 95/53 E, 53 EB; 356/221, 222, 226

[56] References Cited
UNITED STATES PATENTS

| 3,232,192 | 2/1966 | Stimson | 95/10 C |
| 3,545,350 | 12/1970 | Gross | 95/10 CT |
| 3,473,453 | 10/1969 | Gross | 95/10 CT |
| 3,503,314 | 3/1970 | Yasuo Tanabe | 95/10 CT |
| 3,521,962 | 7/1970 | Kenichi Tashiro et al. | 356/222 |

FOREIGN PATENTS OR APPLICATIONS

| 4,419,747 | 8/1969 | Japan | 95/10 CT |

Primary Examiner—Joseph F. Peters, Jr.
Attorney—Robert E. Burns and Emmanuel J. Lobato

[57] ABSTRACT

An exposure-time control circuit having a photoelectric cell and a capacitor coactive in a delay circuit to control exposure time controlled by a switching circuit triggered by a delayed signal in dependence upon the brightness of a subject in a scene or field being photographed and sensed by the photoelectric element. A compensation photoelectric cell determines the level at which the switching circuit is triggered in dependence upon the scene brightness and counter light it senses. The circuit provides for a method of taking a photograph of a scene compensated for counter light from the background of the scene.

3 Claims, 3 Drawing Figures

ELECTRIC SHUTTER EXPOSURE-TIME CONTROL CIRCUIT HAVING COUNTER LIGHT COMPENSATION

BACKGROUND OF THE INVENTION

This invention relates generally to "electric eye" cameras having exposure-time control circuits for electric shutters and particularly for such a circuit having a counter light or backlighting compensation device and relates to a method for taking photographic exposures compensated for counter light.

DESCRIPTION OF PRIOR ART

Automatic "electric eye" cameras are generally constructed such that a time-exposure circuit, controlling the electrically controlled shutter, takes into consideration only the brightness light distribution in the field or scene of which photographic exposure is being taken. When the background light is extremely bright compared to the main subject being photographed, which is generally in the foreground, the time exposure is generally controlled by the brightness of the background rather than the brightness of the principal subject being photographed which is generally in the foreground. Thus, moreover, even though a light metering spot system is employed, taking into consideration the above facts, the brightness other than that of the subject being photographed will generally be entirely neglected, resulting in an exposure without optimum exposure time being properly controlled.

Because of the above problem, the conventional "electric eye" cameras are thus constructed in which an ammeter and a composite type cadmium sulfide photoconductive cell or a combination cadmium sulfide cell and selenium cell are used in the built-in light meter system for compensating the deflection of the pointer of the light meter ammeter to allow taking a counter light photograph or exposure. However, the principles used in this known type of camera are not generally applied to electric eye cameras having a CR delay circuit. In this latter type of camera, in case a counter light photograph is to be taken, with the electric eye controlling an electrically controlled shutter, special techniques or operations have to be executed. For example, the film sensitivity setting is generally set on the camera at a value lower than the sensitivity of the film used in order to compensate for the counter light or backlighting; or it is sometimes the practice to cover the light measurement or sensing device of the camera with a filter in order to increase the exposure delay time and make it higher than the standard value without the filter. In order to execute these camera operations and techniques, it is necessary to have more competency in photography than the usual beginner has who generally is at a loss as to the operations that must be executed for taking a photograph in which counter light is encountered and it is desired to take a photograph other than a silhouette.

SUMMARY OF THE INVENTION

It is a general object of the present invention to provide a time-exposure circuit for electric eye cameras having an electric circuit automatically compensating for counter light in those situations in which a silhouette of the subject being photographed is not being taken.

Another object is to provide a time-exposure circuit capable of allowing the taking of silhouettes by the use of counter light or background light and eliminating the problems of background light or counter light when it is desired to take an exposure other than a silhouette.

Still another object is to provide a method for taking a photograph of a scene compensated for counter light or backlighting in the background.

In accordance with the invention, a conventional exposure time control circuit, for example of the Schmidt type, used in an electric eye camera is altered by provision of a compensation photoconductive cell connected to raise the trigger level at which a switching circuit receiving the delayed trigger or control signal is triggered. The compensation photoconductive element is connected to develop a bias voltage which raises the trigger level of the switching circuit making it possible to obtain a longer exposure time than the usual exposure time for a particular scene brightness.

BRIEF DESCRIPTION OF THE DRAWINGS

Other features and advantages of the time-exposure circuit in accordance with the present invention will be better understood as described in the following specification and appended claims in conjunction with the drawings in which:

DESCRIPTION OF THE PREFERRED EMBODIMENTS

Figure 1:
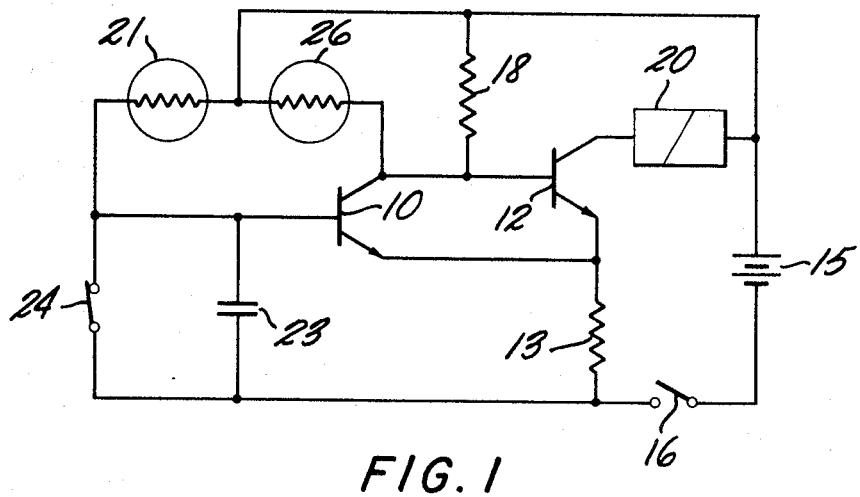
FIG. 1 is a schematic of an exposure-time control circuit provided with counter light compensation means according to the invention.

As illustrated in FIG. 1 a first stage transistor 10 has an emitter directly connected to an emitter of a second stage transistor 12. The emitters of the two transistors are connected to a common resistor 13 connected to a negative terminal of a source of power 15 through a power switch 16. The collector of the first stage transistor 10 is directly connected to the base of the second stage transistor 12 and is connected to the positive terminal of the power source 15 through a resistor 18. The collector of the second stage transistor 12 is connected to the positive terminal of the power source through an electromagnet 20. A cadmium sulfide photoconductive cell 21 has a terminal connected to the positive terminal of the power source 15 and another terminal connected to the negative terminal of the power source through a capacitor 23 when the power switch 16, which is normally open, is closed. A normally closed timing switch 24 is connected in parallel with the capacitor 23 as illustrated. A second cadmium sulfide photoconductive cell 26, constituting a counter light or backlighting compensation element, is connected in parallel with the resistor 18, connected to the collector of the first stage transistor.

With the exception of the counter light compensating element 26 the circuit described is well known and it is used as an exposure-time control circuit for electrically controlled shutters in electric eye cameras in which the delay circuit of the circuitry described is combined with a switching circuit of the Schmidt type. In the circuitry described, the compensation photoelectric cell 26 is arranged in the camera, not shown, to chiefly sense the light of the field or scene being photographed other than the main or principal subject being photographed which is generally in the foreground. Thus, in effect, the compensation element is sensing counter light or backlighting relative to the principal object being photographed. This counter light is background light. The main photoelectric element is the first-mentioned photoelectric cell 21 which senses the light of the subject being photographed.

When the release button of the camera, not shown, is depressed for taking a photograph the open electric power switch 16 is closed by mechanism in the camera, not shown, which is well known. Since at this time the timing switch 24 is still in a closed state the first stage transistor 10 is in a non-conductive state while the second stage transistor 12 is rendered conductive because a base current flows through the resistor 13 connected in common to the emitters of both transistors and through the counter light compensation photoconductive element 26.

The electromagnet 20 is excited or energized by the collector current of the second stage transistor 12 to maintain the shutter closing mechanism, not shown, in well known manner. In this state, the current flow through the resistor 13 develops a bias voltage which mainly determines the trigger level of the switching circuit of the control circuitry. As the camera release button or lever, not shown, is further depressed, the shutter, not shown, begins to open and at the same time the timing switch 24 is opened so that the capacitor 23 is charged through the main photoconductive cell 21. When the charging voltage of the capacitor is raised to a level corresponding to the trigger level of the switching circuit the first stage transistor is unblocked and is rendered conductive and the second stage transistor is rendered non-conductive so that the electromagnet is deenergized and the shutter closing mechanism, not shown, is actuated so that the shutter is closed and the photographic exposure is terminated.

In the event that a photograph in which counter light or backlighting is present is being taken the counter light is sensed by the counter light compensating photoelectric cell 26. Its resistance is lowered and this increases the base current of the second stage transistor, its collector current is also increased, and therefore the bias voltage becomes large and raises the trigger level of the switching circuit making it possible to obtain a longer exposure time than would be the case without counter light being sensed.

Figure 2:
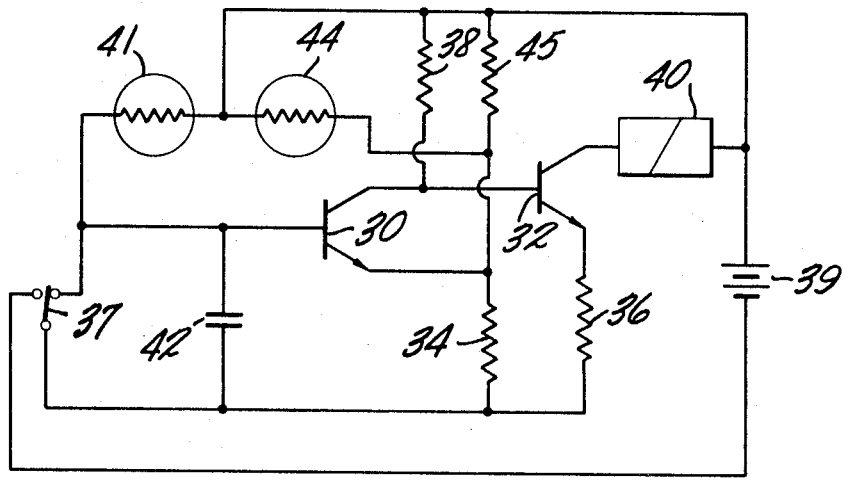
FIG. 2 is a schematic of a second embodiment of circuit of the type illustrated in FIG. 1.

A second embodiment of time-exposure control circuit embodying the invention is illustrated in FIG. 2. In this circuit a first stage transistor 30 has its collector connected to the base of a second stage transistor 32. The emitters of both transistors are separately connected through respective resistors 34, 36 to a power switch 37 connected to a source of power 39. The collector of the first stage transistor is connected to the power source through a resistor 38 and the collector of the second stage transistor is connected to the power source through an electromagnet operating coil 40. A main photoconductive cell 41 is connected as before to a capacitor 42 in parallel to the two emitter circuit resistors 34, 36. A counter light compensation photoconductive cell 44 is connected to the main cell and a voltage divider comprising a resistor 45 connected across the circuit in conjunction with the resistor 34 connected to the emitter of the first stage transistor.

In the time-exposure control circuit embodiment shown in FIG. 2 the delay circuit exists as before and the switching circuit is of the amplification type in which the trigger level is determined by applying the voltage of the electric power source mainly to the emitter of the first stage transistor by dividing the voltage with the voltage-dividing resistors 34 and 45. The circuit is a well known exposure-time control circuit for electrically controlled shutters, except for the counter light compensation photoelectric cell 44.

In this second circuit, in the event that a counter light photograph is being taken the resistance of the compensating photoelectric cell is lowered and the emitter voltage of the second stage transistor is raised so the trigger level is also elevated, enabling a longer exposure time than would be the case otherwise. The operation of this circuit is otherwise about the same as that of the embodiment in FIG. 1. The power switch 37 functions also as a timing switch closed and opened by mechanisms not shown.

In the two circuits described the counter light compensation is effected automatically by provision of a counter light or backlighting compensation photoconductive cell in parallel to well known circuitry at a point for determining the trigger level of the switching circuit. There is no other need of modifying the conventional electric shutter mechanism since the amount of compensation is automatically adjusted according to the degree of counter light. No particular operations need be effected or inputs introduced into the camera in taking a counter light photograph with circuitry according to the invention.

In the circuitry described the main photoelectric elements 21, 41 sense the light from the scene and subject being photographed and the counter light compensation photoelectric elements sense the counter light or background light and may be separately disposed in the camera. The photoelectric elements are as described elements that have an electrical parameter which varies in accordance with the quantity of light incident thereon. The camera makes provision, for example by an optical and diaphragm system, not shown, for having the photoelectric elements sensing the respective light as described above.

Figure 3:
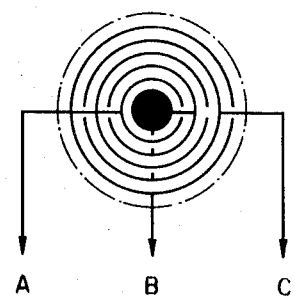
FIG. 3 is a front view of an example of a compound photoelectric cell for use in the exposure-time control circuits according to the invention.

Provision is made in accordance with the invention for having the photoelectric elements constructed as a single compound type photoelectric element in which the photoconductors are concentric about an optical axis, as illustrated in FIG. 3. Thus, a part of a photoelectric element between two terminals A, B can function as the main photoelectric element and another part thereof between one of the two terminals and another terminal B, C, can function as the counter light compensating photoelectric element. The compound element must be arranged in a camera so that the light impinging thereon corresponds to the respective light as above described.

Those skilled in the art can readily understand that the circuitry described in both embodiments may be provided with a switch for cutting off from the circuit the compensation photoelectric element so that counter light photography can be carried out without compensation at will, for example so that silhouettes or the like may be photographed.

Moreover, the invention teaches varying the magnitude of one of the characteristics, for example a voltage level, of an electrical, control time-delayed output signal triggering a trigger circuit that controls closing of an electric shutter thereby to effect photographic exposures compensated for counter light in a scene being photographed. The variation in the signal results in a time delay compensation of the output signal or command signal. It is, of course, understood that the electrical output signal is a trigger signal triggering the trigger circuit and the ultimate output is a command to an electric shutter mechanism for closing the shutter and terminating an exposure period.

What I claim and desire to secure by Letters Patent is:

1. A photographic exposure control circuit for use in a camera having an electrically controlled shutter comprising, a switching circuit having a trigger level and triggered by trigger input exceeding said trigger level for controlling in use an electrically controlled shutter, an exposure control delay circuit connected to said switching circuit and having a light-responsive element having an electrical parameter which varies in use in accordance with the quantity of light incident thereon from a respective portion of a field of exposure being photographed and including capacitor means for developing a trigger signal applied as said input for triggering said switching circuit when said capacitor is charged to said trigger level, and a second light-responsive element connected in said switching circuit varying the trigger level thereof and having an electrical parameter which varies in use in accordance with the quantity of light incident thereon from a respective portion of said field of exposure and different from the first-mentioned respective portion of said field of exposure thereby to vary said trigger level as a function of the quantity of light received from said other portion, whereby the delay time of said exposure control delay circuit is in part a function of the brightness of said other portion of said field of exposure.

2. A photographic exposure control circuit for use in a camera having an electrically controlled shutter according to claim 1, in which said light-responsive elements comprise two photoconductors in series.

3. A photographic exposure control circuit for use in a camera having an electrically controlled shutter according to claim 1, in which said light-responsive elements comprise two photoconductors arranged concentrically about a common axis.

* * * * *